(12) United States Patent
Yamaoka et al.

(10) Patent No.: US 12,533,913 B2
(45) Date of Patent: Jan. 27, 2026

(54) TIRE

(71) Applicant: Sumitomo Rubber Industries, Ltd., Hyogo (JP)

(72) Inventors: Hiroshi Yamaoka, Kobe (JP); Hiroki Mizokawa, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 85 days.

(21) Appl. No.: 18/507,967

(22) Filed: Nov. 13, 2023

(65) Prior Publication Data

US 2024/0227456 A1 Jul. 11, 2024

(30) Foreign Application Priority Data

Jan. 11, 2023 (JP) ................. 2023-002628

(51) Int. Cl.
*B60C 11/12* (2006.01)
*B60C 11/03* (2006.01)

(52) U.S. Cl.
CPC ...... *B60C 11/1204* (2013.01); *B60C 11/0306* (2013.01); *B60C 11/1236* (2013.01);
(Continued)

(58) Field of Classification Search
CPC . B60C 11/03; B60C 11/0304; B60C 11/0306; B60C 2011/1213
See application file for complete search history.

(56) References Cited

U.S. PATENT DOCUMENTS 6,408,911 B1 * 6/2002 Tanabe ................ B60C 11/1369
152/902
2017/0225516 A1 * 8/2017 Kose ................... B60C 11/1218
(Continued)

FOREIGN PATENT DOCUMENTS

EP 1157859 A1 11/2001
EP 3254872 A1 * 12/2017 ........... B60C 11/033
(Continued)

OTHER PUBLICATIONS

The extended European search report issued by the European Patent Office on Jan. 30, 2024, which corresponds to European Patent Application No. 23219117.1-1012 and is related to U.S. Appl. No. 18/507,967.

*Primary Examiner* — Cedrick S Williams
(74) *Attorney, Agent, or Firm* — Studebaker Brackett PLLC (57) ABSTRACT

A tire 1 includes a tread portion 2. The tread portion 2 includes tread ends Te, three circumferential grooves 3, and four land portions 4. The circumferential grooves 3 include one shoulder circumferential groove 5 and one crown circumferential groove 6. The land portions 4 include one shoulder land portion 9 and one crown land portion 10. The shoulder land portion 9 includes shoulder blocks having shoulder sipes. An inner end of the shoulder sipe in the tire axial direction terminates at a ground contact surface of the shoulder block. The crown land portion 10 includes crown blocks having crown sipe groups. The crown sipe group includes a first crown sipe having one end connected to the shoulder circumferential groove 5 and another end terminating at a ground contact surface of the crown block, a second crown sipe having one end connected to the crown circumferential groove 6 and another end terminating at the surface, and a third crown sipe having both ends terminating at the surface.

20 Claims, 5 Drawing Sheets

(52) U.S. Cl.
CPC .............. *B60C 2011/0346* (2013.01); *B60C 2011/1213* (2013.01); *B60C 2011/1254* (2013.01)

(56) References Cited

U.S. PATENT DOCUMENTS

2018/0015790 A1* 1/2018 Oji .................. B60C 11/047
2021/0323356 A1* 10/2021 Nagayasu ........... B60C 11/1204

FOREIGN PATENT DOCUMENTS

| | | | |
|---|---|---|---|
| JP | 2014193629 A | * | 10/2014 |
| JP | 6286079 B2 | | 2/2018 |
| WO | 2022/050287 A1 | | 3/2022 |

* cited by examiner

TIRE

BACKGROUND OF THE INVENTION

Field of the Invention

The present invention relates to a tire.

Background Art

In recent years, a tire (for example, studless tire, tire for all seasons) intended for running on ice has been structured to have a plurality of sipes in a block of a tread portion (see Japanese Patent No. 6286079).

The sipe as described above allows on-ice performance to be enhanced by an edge effect or the like, but may have a problem that shear deformation in the tire circumferential direction is increased when the block comes into contact with a road surface, and this eventually causes uneven wear such as heel-and-toe wear in the block.

The present invention has been made in order to solve the aforementioned problem, and a main object of the present invention is to provide a tire that allows uneven wear to be reduced while enhancing on-ice performance.

SUMMARY OF THE INVENTION

The present invention is directed to a tire that includes a tread portion, in which: the tread portion includes a pair of tread ends, three circumferential grooves continuously extending in a tire circumferential direction between the pair of tread ends, and four land portions demarcated by the three circumferential grooves; the three circumferential grooves include one shoulder circumferential groove, and one crown circumferential groove adjacent to an inner side of the shoulder circumferential groove in a tire axial direction; the four land portions include one shoulder land portion demarcated outward of the shoulder circumferential groove in the tire axial direction, and one crown land portion demarcated between the shoulder circumferential groove and the crown circumferential groove; the shoulder land portion includes a plurality of shoulder blocks demarcated by a plurality of shoulder lateral grooves that extend fully across the shoulder land portion in the tire axial direction; each of the plurality of shoulder blocks has a plurality of shoulder sipes extending in the tire axial direction; an inner end of each of the plurality of shoulder sipes in the tire axial direction terminates at a ground contact surface of the shoulder block without connecting to the shoulder circumferential groove; the crown land portion includes a plurality of crown blocks demarcated by a plurality of crown lateral grooves that extend fully across the crown land portion in the tire axial direction; each of the plurality of crown blocks includes, in a tire circumferential direction, a plurality of crown sipe groups each having a plurality of crown sipes aligned in the tire axial direction; and each of the crown sipe groups includes one first crown sipe having one end connected to the shoulder circumferential groove and another end terminating at a ground contact surface of the crown block, one second crown sipe having one end connected to the crown circumferential groove and another end terminating at the ground contact surface of the crown block, and at least one third crown sipe having both ends terminating at the ground contact surface of the crown block.

The tire of the present invention has the above-described configuration, and thus allows uneven wear to be reduced while enhancing on-ice performance.

DETAILED DESCRIPTION

Figure 1:
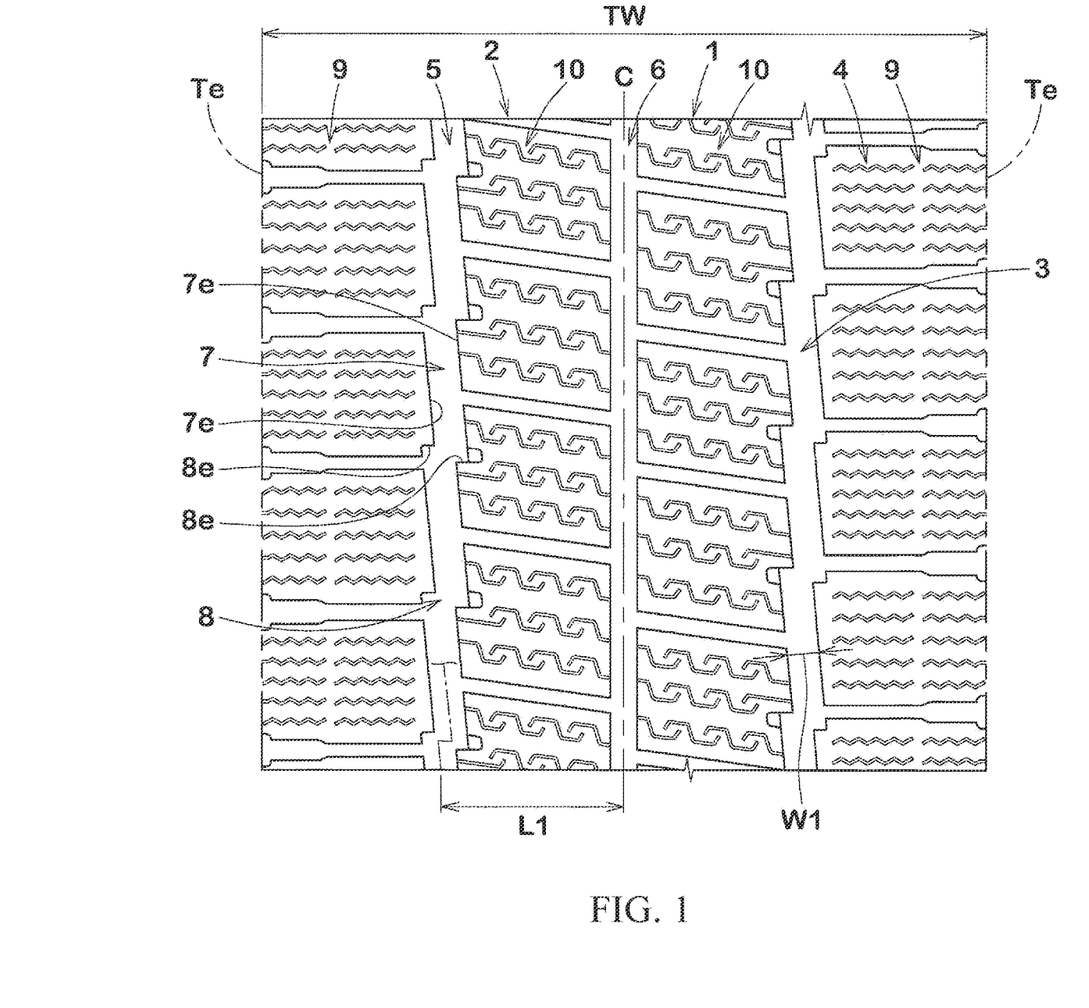
FIG. 1 is a development of a tread portion of a tire according to one embodiment of the present invention.

One embodiment of the present invention will be described below with reference to the drawings. FIG. 1 is a development of a tread portion 2 of a tire 1 according to one embodiment of the present invention. For example, the tire 1 of the present embodiment is suitably used as a pneumatic tire for passenger cars in winter. However, the present invention is not limited thereto.

As shown in FIG. 1, the tread portion 2 includes a pair of tread ends Te, Te, three circumferential grooves 3 that continuously extend in the tire circumferential direction between the pair of tread ends Te and Te, and four land portions 4 demarcated by the three circumferential grooves 3.

The pair of tread ends Te, Te correspond to ends, respectively, of a ground contact surface in a state (standardized load state) in which 70% of a standardized load is applied to the tire 1 in a standardized state, and the tread portion 2 is brought into contact with a plane at a camber angle of 0°.

The "standardized state" represents a state in which a tire is mounted on a standardized rim and is inflated to a standardized internal pressure and no load is applied to the tire, for pneumatic tires for which various standards are defined. For non-pneumatic tires and tires for which various standards are not defined, the standardized state represents a standard use state, corresponding to a purpose of use of the tire, in which no load is applied to the tire. In the present specification, unless otherwise specified, dimensions and the like of components of the tire are represented as values measured in the standardized state.

The "standardized rim" represents a rim that is defined, in a standard system including a standard on which the tire is based, by the standard for each tire, and is, for example, "standard rim" in the JATMA standard, "Design Rim" in the TRA standard, or "Measuring Rim" in the ETRTO standard.

The "standardized internal pressure" represents an air pressure that is defined, in a standard system including a standard on which the tire is based, by the standard for each tire, and is "maximum air pressure" in the JATMA standard, the maximum value recited in the table "TIRE LOAD LIMITS AT VARIOUS COLD INFLATION PRESSURES" in the TRA standard, or "INFLATION PRESSURE" in the ETRTO standard.

The "standardized load" represents a load that is defined, in a standard system including a standard on which the tire is based, by the standard for each tire, and is "maximum load capacity" in the JATMA standard, the maximum value recited in the table "TIRE LOAD LIMITS AT VARIOUS COLD INFLATION PRESSURES" in the TRA standard, or "LOAD CAPACITY" in the ETRTO standard, for pneumatic tires for which various standards are defined. For tires for which various standards are not defined, the "standardized load" represents the maximum load that is applicable when the tire is used, according to the above-described standards.

The three circumferential grooves 3 include at least one shoulder circumferential groove 5, and one crown circumferential groove 6 adjacent to the inner side of the shoulder circumferential groove 5 in the tire axial direction. In the present embodiment, two shoulder circumferential grooves 5, and one crown circumferential groove 6 located between the two shoulder circumferential grooves 5 are disposed. In the present embodiment, each shoulder circumferential groove 5 is disposed between the tire equator C and one or the other of the tread ends Te. Preferably, in the present embodiment, the crown circumferential groove 6 is disposed on the tire equator C.

A distance L1 in the tire axial direction from the groove center line of the shoulder circumferential groove 5 to the tire equator C is, for example, 20% to 30% of a tread width TW. However, the present invention is not limited thereto. The tread width TW corresponds to a distance in the tire axial direction between the pair of tread ends Te and Te in the standardized state.

A groove width W1 of the circumferential groove 3 is preferably at least 3.0 mm. The groove width W1 of the circumferential groove 3 is, for example, 3.0% to 6.0% of the tread width TW. A depth (not shown) of the circumferential groove 3 is, for example, 5.0 to 15.0 mm. However, the circumferential groove 3 is not limited to such a structure. In the present specification, the groove width is measured in a direction orthogonal to the groove length direction of each groove on the ground contact surface of the tread portion.

The four land portions 4 at least include one shoulder land portion 9 and one crown land portion 10. The shoulder land portion 9 is demarcated and disposed outward of the shoulder circumferential groove 5 in the tire axial direction. The crown land portion 10 is demarcated between the shoulder circumferential groove 5 and the crown circumferential groove 6. In the present embodiment, the four land portions 4 include two shoulder land portions 9 and two crown land portions 10. In the present embodiment, the two shoulder land portions 9 are disposed so as to be symmetrical about the center of rotation on the tire equator C. In the present embodiment, the two crown land portions 10 are disposed so as to be symmetrical about the center of rotation on the tire equator C. Therefore, the configuration of one of the shoulder land portions 9 described below can also be applied to the other of the shoulder land portions 9. The same applies to the crown land portions 10.

Figure 2:
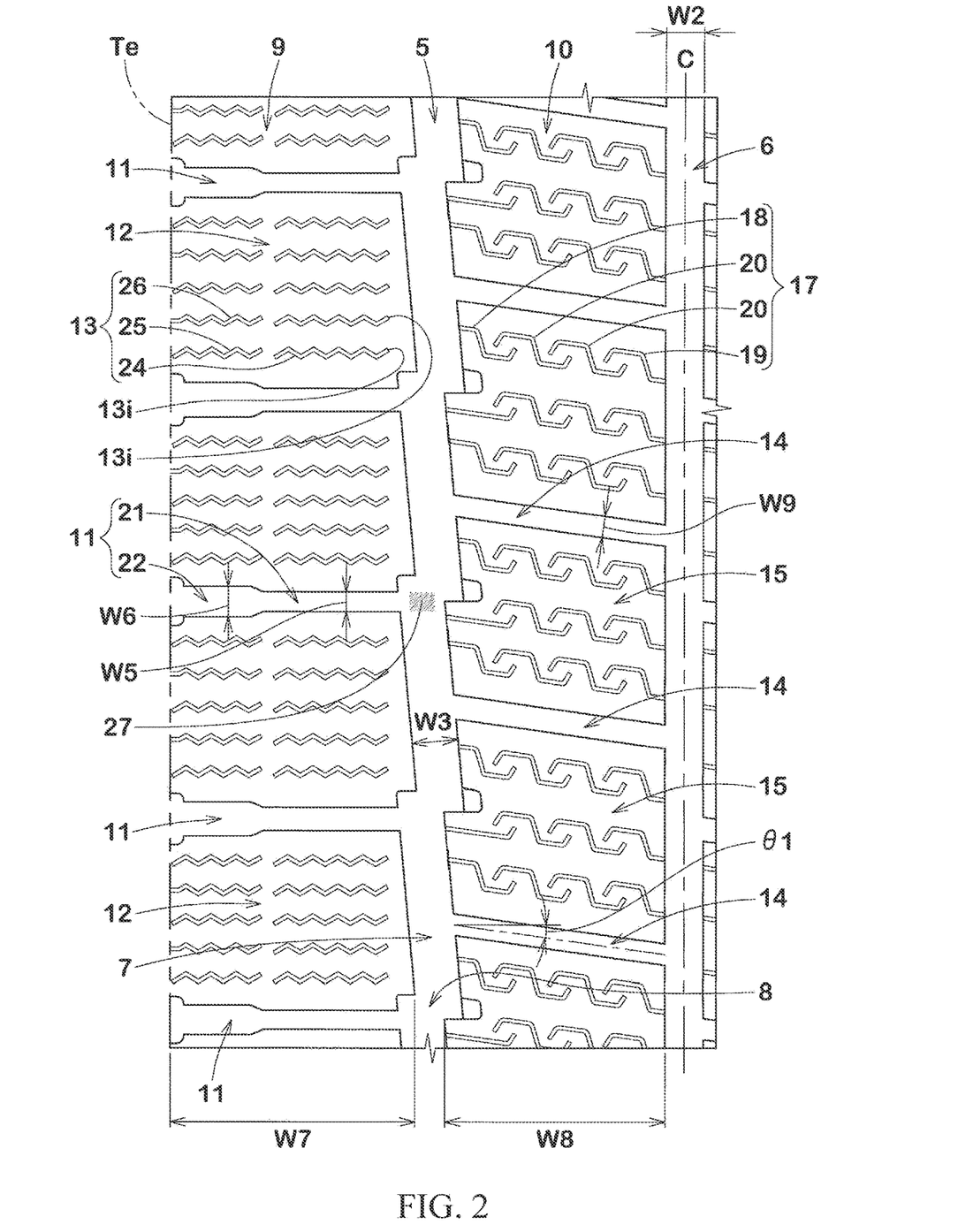
FIG. 2 is an enlarged view of a shoulder land portion and a crown land portion in FIG. 1.

FIG. 2 is an enlarged view of the shoulder land portion 9 and the crown land portion 10. As shown in FIG. 2, the shoulder land portion 9 includes a plurality of shoulder lateral grooves 11. The shoulder lateral grooves 11 extend fully across the shoulder land portion 9 in the tire axial direction. Thus, the shoulder land portion 9 includes a plurality of shoulder blocks 12 demarcated by the plurality of shoulder lateral grooves 11.

In the present specification, the "lateral groove" represents a groove extending in the tire axial direction and having a groove width of greater than 1.5 mm. The groove width of the lateral groove is preferably 60% to 80% of the groove width W1 (shown in FIG. 1) of the circumferential groove 3.

Figure 3:
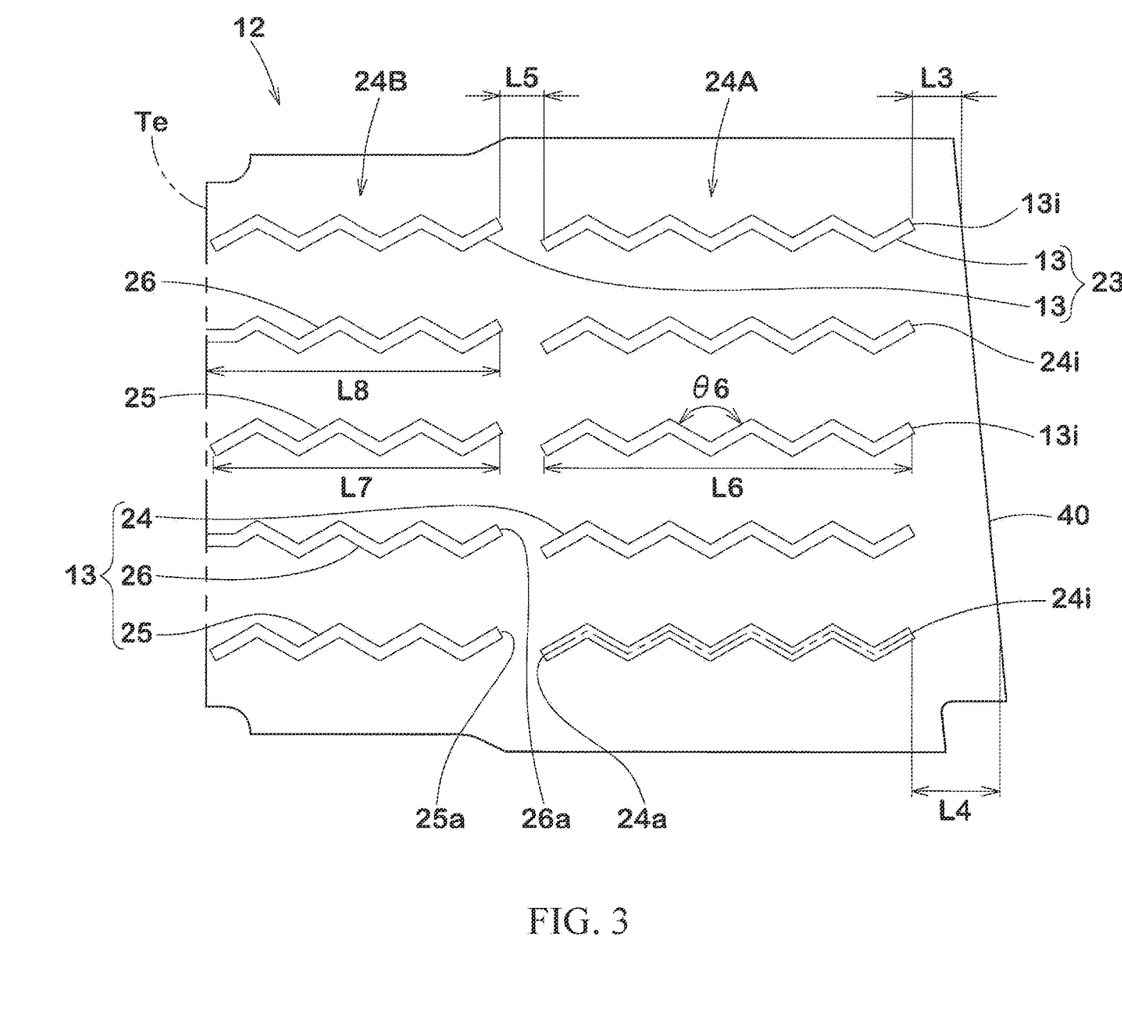
FIG. 3 is an enlarged view of a shoulder block in FIG. 2.

FIG. 3 is an enlarged view of the shoulder block 12. As shown in FIG. 3, each of the plurality of shoulder blocks 12 includes a plurality of shoulder sipes 13 extending in the tire axial direction. Each of inner ends 13*i* of the plurality of shoulder sipes 13 in the tire axial direction terminates at the ground contact surface of the shoulder block 12 without connecting to a groove edge 40 of the shoulder circumferential groove 5.

In the present specification, the "sipe" represents a cut portion in which a width between two opposing inner walls is 1.5 mm or less. Such sipes are structured such that the two inner walls at least partially come into contact with each other at the ground contact surface in a state where a standardized load is applied. From such a viewpoint, the width of the sipe is preferably 1.2 mm or less and more preferably 1.0 mm or less. The width of the sipe is preferably 0.3 mm or more and more preferably 0.5 mm or more from the viewpoint of facilitating vulcanization and molding. In the present embodiment, the sipe has a constant width over the entire depth, and has the width in the above-described range. The sipe may have a chamfered portion at the opening at the ground contact surface. Furthermore, at the bottom of the sipe, a portion (also referred to as so-called flask bottom) at which the width is increased so as to be greater than 1.5 mm may be added.

As shown in FIG. 2, the crown land portion 10 includes a plurality of crown lateral grooves 14. The crown lateral grooves 14 extend fully across the crown land portion 10 in the tire axial direction. Thus, the crown land portion 10 is divided into a plurality of crown blocks 15 by the plurality of crown lateral grooves 14.

Figure 4:
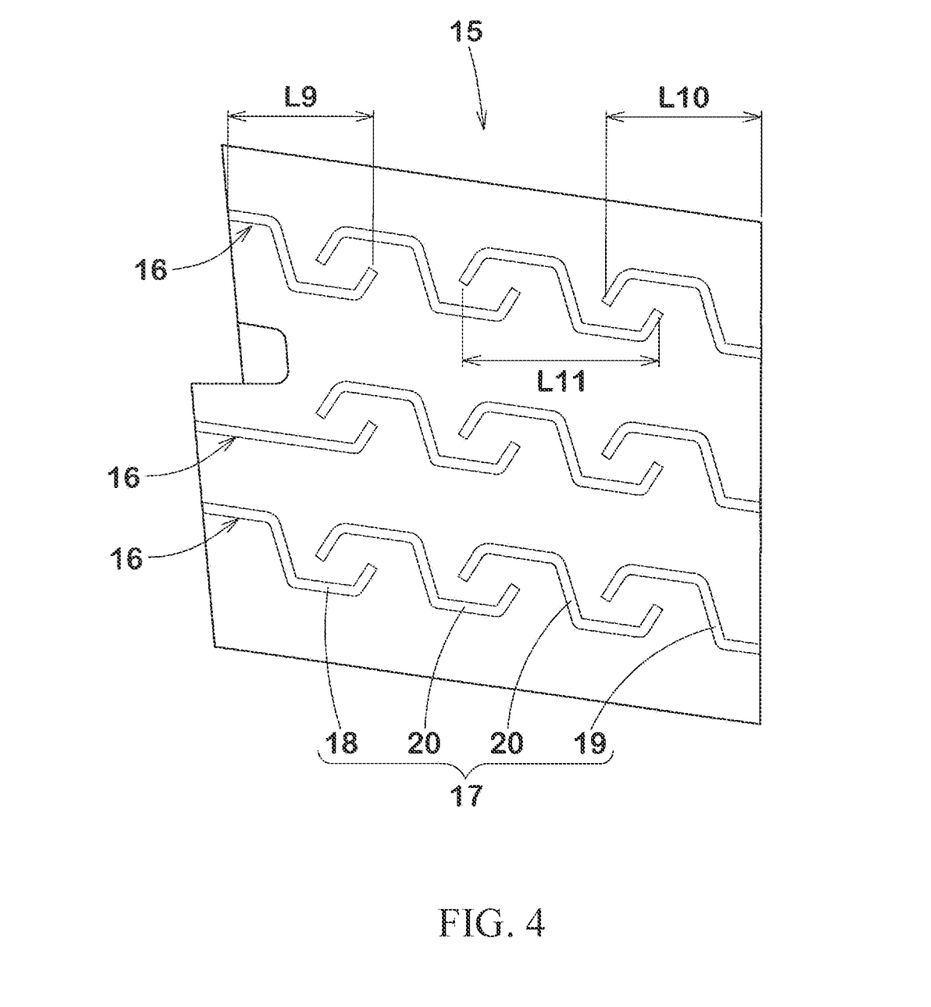
FIG. 4 is an enlarged view of a crown block in FIG. 2.

FIG. 4 is an enlarged view of the crown block 15. As shown in FIG. 4, each of the plurality of crown blocks 15 has a plurality of crown sipe groups 16 in the tire circumferential direction. Each crown sipe group 16 includes a plurality of crown sipes 17 aligned in the tire axial direction.

Each of the crown sipe groups 16 includes, for example, a first crown sipe 18, a second crown sipe 19, and a third crown sipe 20. The first crown sipe 18 has one end connected to the shoulder circumferential groove 5 (see FIG. 2), and the other end terminating at the ground contact surface of the crown block 15. The second crown sipe 19 has one end connected to the crown circumferential groove 6 (see FIG. 2), and the other end terminating at the ground contact surface of the crown block 15. The third crown sipe 20 has both ends terminating at the ground contact surface of the crown block 15.

The plurality of shoulder sipes 13 and the plurality of crown sipe groups 16 described above allow a high frictional force to be exerted in the tire circumferential direction by an edge effect or the like during running on ice, and allow enhancement of on-ice performance.

Meanwhile, in general, in a tread portion including four land portions, a load supported by one land portion tends to be increased as compared with a tread portion including five land portions. In a shoulder land portion on the tread end side, change of the load is greater and the ground contact length is more easily changed as compared with a crown land portion on the tire equator side. Therefore, in the shoulder block included in the shoulder land portion, a sliding distance in the tire circumferential direction is relatively great during braking or the like, and uneven wear such as heel-and-toe wear is likely to occur.

In order to address such a problem, in the present invention, as shown in FIG. 3, the inner end 13*i* of the shoulder sipe 13 in the tire axial direction terminates at the ground contact surface of the shoulder block 12 without connecting to the shoulder circumferential groove 5. Thus, stiffness of the shoulder block 12 in the tire circumferential direction is enhanced, so that shear deformation in the tire circumferential direction is reduced during braking or the like, and uneven wear can be eventually reduced.

As shown in FIG. 4, the crown sipe group 16 does not continuously extend from the shoulder circumferential groove 5 to the crown circumferential groove 6. Thus, stiffness of the crown block 15 in the tire circumferential direction is also enhanced, so that shear deformation is reduced during braking or the like, and uneven wear of the crown block 15 can also be reduced. Among the crown sipes, the first crown sipe 18 has one end connected to the shoulder circumferential groove 5, and the second crown sipe 19 has one end connected to the crown circumferential groove 6. Thus, water absorbed by the first crown sipe 18 is discharged toward the shoulder circumferential groove 5 during running on ice. Similarly, water absorbed by the second crown sipe 19 is discharged toward the crown circumferential groove 6. Therefore, a water film on an icy road is effectively removed, and on-ice performance is further enhanced. As described above, the tire 1 of the present embodiment allows uneven wear to be reduced while enhancing on-ice performance.

In a case where the four land portions include one pair of the shoulder land portion 9 and the crown land portion 10 adjacent to each other, the above-described effect is exhibited. In the present embodiment, the tire 1 includes the above-described pairs on both sides, respectively, of the tire equator C. Therefore, the above-described effect can be more effectively exhibited.

The configurations of the present embodiment will be described below in more detail. The configurations described below represent a specific mode of the present embodiment. Therefore, it is needless to say that the present invention can achieve the above-described effect even when the configurations described below are not provided. In addition, even when any one of the configurations described below is independently applied to the tire according to the present invention having the above-described characteristics, performance improvement corresponding to each configuration can be expected. Furthermore, when some of the configurations described below are applied in combination, complex performance improvement corresponding to the configurations can be expected.

Crown Circumferential Groove, Shoulder Circumferential Groove

As shown in FIG. 1, in the present embodiment, the shoulder circumferential groove 5 zigzags. Specifically, in the present embodiment, the shoulder circumferential groove 5 includes a plurality of circumferential groove portions 7 and a plurality of lateral groove portions 8 that alternate in the tire circumferential direction, and thus zigzags. The circumferential groove portion 7 is, for example, formed by two edges 7e that are inclined at 5 to 15° relative to the tire circumferential direction. The lateral groove portion 8 is formed by two edges 8e disposed at an angle of 10° or less relative to the tire axial direction. The shoulder circumferential groove 5 having such a structure can strongly compact snow thereinside. Meanwhile, the crown circumferential groove 6 linearly extends in parallel to the tire circumferential direction. However, the shoulder circumferential groove 5 and the crown circumferential groove 6 are not limited thereto.

As shown in FIG. 2, in the present embodiment, the crown circumferential groove 6 extends with a constant groove width in the tire circumferential direction. A groove width W2 of the crown circumferential groove 6 is preferably 4.0% of the tread width TW (shown in FIG. 1) or less and more preferably 3.0% to 4.0% thereof. A groove width W3 of the circumferential groove portion 7 of the shoulder circumferential groove 5 is, for example, 4.0% to 5.0% of the tread width TW. In the present embodiment, the groove width W2 of the crown circumferential groove 6 is less than the groove width W3 of the circumferential groove portion 7 of the shoulder circumferential groove 5. Thus, the shoulder circumferential groove 5 allows excellent on-ice performance to be exhibited while uneven wear is reduced near the crown circumferential groove 6.

Shoulder Lateral Groove

In the present embodiment, the shoulder lateral groove 11 includes an inner groove portion 21 and an outer groove portion 22. The inner groove portion 21 is connected to the shoulder circumferential groove 5, and extends with a constant groove width W5. The outer groove portion 22 is connected to the outer side of the inner groove portion 21 in the tire axial direction, and extends at least to one of the tread ends Te. The outer groove portion 22 extends with a constant groove width W6 in the tire axial direction, and has an increased groove width near the tread end Te. The groove width W6 of the outer groove portion 22 is greater than the groove width W5 of the inner groove portion 21. Specifically, the groove width W6 is 130% to 150% of the groove width W5. The shoulder lateral groove 11 including the inner groove portion 21 and the outer groove portion 22 having such structures can reduce uneven wear of the shoulder land portion 9 near a portion connected to the shoulder circumferential groove 5.

Shoulder Sipe

As shown in FIG. 3, in the shoulder block 12, the plurality of the shoulder sipes 13 are aligned in the tire circumferential direction and the tire axial direction. Specifically, in the shoulder block 12, a plurality of sipe pairs 23 composed of the two shoulder sipes 13 aligned in the tire axial direction are disposed in the tire circumferential direction.

The plurality of sipe pairs 23 described above allow a first sipe group 24A and a second sipe group 24B to be disposed in each of the plurality of shoulder blocks. In the first sipe group 24A, a plurality of the shoulder sipes 13 are aligned on the shoulder circumferential groove 5 side in the tire circumferential direction. In the second sipe group 24B, a plurality of the shoulder sipes 13 are aligned on the tread end Te side in the tire circumferential direction. In the present embodiment, each of the shoulder sipes 13 in the first sipe group 24A and each of the shoulder sipes 13 in the second sipe group 24B are not connected to each other, so that shear deformation of the shoulder land portion 9 in the tire circumferential direction is reduced, and uneven wear can be reduced.

In the present embodiment, each of the first sipe group 24A and the second sipe group 24B includes, for example, 4 to 6 shoulder sipes 13. Thus, one shoulder block 12 includes 8 to 12 shoulder sipes 13.

In a case where the number of the shoulder sipes 13 aligned in the tire circumferential direction is four or more, on-ice performance is enhanced. In a case where the number of the shoulder sipes 13 aligned in the tire circumferential direction is six or less, shear deformation of the shoulder land portion 9 in the tire circumferential direction is reduced, and uneven wear can be reduced. Each of the plurality of the shoulder blocks 12 more preferably has the 4 to 5 shoulder sipes 13 aligned in the tire circumferential direction. Thus, uneven wear can be further reduced. However, the present invention is not limited thereto.

The shoulder sipes 13 include a plurality of first shoulder sipes 24 included in the first sipe group 24A, and a plurality of second shoulder sipes 25 and a plurality of third shoulder sipes 26 which are included in the second sipe group 24B.

The first shoulder sipe 24 is not connected to the shoulder circumferential groove 5 and has both ends terminating at the ground contact surface of the shoulder block 12.

The plurality of the shoulder sipes 13 preferably include the shoulder sipe 13 in which a distance L3 in the tire axial direction from the inner end 13i to the groove edge 40 of the shoulder circumferential groove 5 is 1 to 5 mm. In the present embodiment, a distance L4 in the tire axial direction from an inner end 24i of the first shoulder sipe 24 to the groove edge 40 of the shoulder circumferential groove 5 is 1 to 5 mm. In a case where the distance L4 is 1 to 5 mm, uneven wear is reduced near the groove edge 40 of the shoulder circumferential groove 5, and the length of each sipe can be sufficiently ensured and on-ice performance can thus be enhanced.

In the present embodiment, the distance L4 in the tire axial direction from the inner ends 24i of the first shoulder sipes 24 to the groove edge 40 of the shoulder circumferential groove 5 is increased toward one side in the tire circumferential direction. In a case where at least one of the distances L4 is 1 to 5 mm, the above-described effect can be exhibited. Preferably, all the distances L4 are each 1 to 5 mm. In this case, the above-described effect is more effectively exhibited.

Preferably, positions of ends 24a of the first shoulder sipes 24 on the tread end Te side are aligned in the tire axial direction. Specifically, a distance in the tire axial direction between the end 24a of one of the first shoulder sipes 24 and the end 24a of the first shoulder sipe 24 adjacent to the one of the first shoulder sipes 24 is preferably 2.0 mm or less and more preferably 1.0 mm or less. Thus, each of the first shoulder sipes 24 is easily opened, and high frictional force can be exerted during running on ice.

In the present embodiment, the second sipe group 24B is composed of three second shoulder sipes 25 and two third shoulder sipes 26, and the second shoulder sipes 25 and the third shoulder sipes 26 alternate in the tire circumferential direction. In the second shoulder sipes 25 and the third shoulder sipes 26, the end on the tire equator C side terminates at the ground contact surface of the shoulder block 12. The end of the second shoulder sipe 25 on the tread end Te side extends to the vicinity of the tread end Te, but does not reach the tread end. A distance in the tire axial direction from the end of the second shoulder sipe 25 on the tread end Te side to the tread end Te is, for example, 5 mm or less. Meanwhile, the end of the third shoulder sipe 26 on the tread end Te side extends at least to the tread end Te, and, in the present embodiment, extends beyond the tread end Te (not shown). The second shoulder sipes 25 and the third shoulder sipes 26 having such structures allow wandering performance to be enhanced while uneven wear is reduced near the tread end Te.

Preferably, positions of ends of the second shoulder sipes 25 and the third shoulder sipes 26 on the tire equator C side are aligned in the tire axial direction. Specifically, a distance in the tire axial direction between an end 25a of one of the second shoulder sipes 25 and an end 26a of the third shoulder sipe 26 adjacent to the one of the second shoulder sipes 25 is preferably 2.0 mm or less and more preferably 1.0 mm or less. Thus, the second shoulder sipes 25 and the third shoulder sipes 26 are opened with appropriate ease, and a high frictional force can be exerted during running on ice.

In the present embodiment, a distance L5 in the tire axial direction between the first shoulder sipe 24, and the second shoulder sipe 25 or the third shoulder sipe 26 is 2.0 to 5.0 mm. Thus, uneven wear can be reduced at the center portion of the shoulder block 12 in the tire axial direction.

Each shoulder sipe 13 preferably zigzags. In each shoulder sipe 13, an angle of an imaginary straight line (not shown) connecting between both the ends, relative to the tire axial direction, is preferably 0 to 5°. A bending angle θ6 of the zigzag shoulder sipe 13 is, for example, 100 to 120°. The shoulder sipes 13 having such a structure allow an edge effect to be easily obtained, and a frictional force can be exerted also in the tire axial direction during running on ice.

A length, in the tire axial direction, of each of the plurality of the shoulder sipes 13 is preferably less than 60% of the maximum width W7, in the tire axial direction, of the ground contact surface of the shoulder land portion 9. More preferably, a length L6, in the tire axial direction, of each of the first shoulder sipes 24 is less than 60% of the maximum width W7 (shown in FIG. 2, the same applies to the following description), in the tire axial direction, of the ground contact surface of the shoulder land portion. A length L7, in the tire axial direction, of each of the second shoulder sipes 25 at the ground contact surface, and a length L8, in the tire axial direction, of each of the third shoulder sipes 26 at the ground contact surface, are each less than 60% of the maximum width W7, in the tire axial direction, of the ground contact surface of the shoulder land portion. Thus, shear deformation of the shoulder land portion in the tire circumferential direction is reduced, whereby uneven wear can be reduced. The length, in the tire axial direction, of each of the plurality of the shoulder sipes 13 is more preferably 20% to 50% of the maximum width W7, in the tire axial direction, of the ground contact surface of the shoulder land portion 9. Thus, shear deformation of the shoulder land portion 9 in the tire circumferential direction is further reduced, whereby uneven wear can be further reduced. In the present specification, the length of the sipe is measured at the center line of the sipe.

The first shoulder sipe 24 is disposed closer to the tire equator C than the second shoulder sipe 25 and the third shoulder sipe 26 are. The length L6 of the first shoulder sipe 24 is greater than each of the length L7 of the second shoulder sipe 25 and the length L8 of the third shoulder sipe 26. Thus, since the shoulder sipes 13 having a greater length are disposed closer to the tire equator C, an edge effect is easily obtained, and a high frictional force can be exerted.

Crown Lateral Groove

As shown in FIG. 2, for example, the crown lateral groove 14 extends linearly in the tire axial direction with a constant groove width W9. The groove width W9 of the crown lateral groove 14 is, for example, less than the groove width W6 of the outer groove portion 22 of the shoulder lateral groove 11. Specifically, the groove width W9 of the crown lateral groove 14 is 60% to 80% of the groove width W6 of the outer groove portion 22. The crown lateral groove 14 having such a structure can allow uneven wear of the crown land portion 10 to be reduced and allows steering stability on a dry road surface to be enhanced.

For example, the crown lateral groove 14 is slightly inclined relative to the tire axial direction. The maximum angle θ1 of the crown lateral groove 14 relative to the tire axial direction is 30° or less and preferably 5 to 15°.

The crown lateral groove 14 is preferably connected to the shoulder circumferential groove 5 at a position different from a position at which the shoulder lateral groove 11 is connected to the shoulder circumferential groove 5, in the tire circumferential direction. Specifically, in a tread planar view, an imaginary region 27 (indicated by dots in FIG. 2) obtained by extending the end portion of the shoulder lateral groove 11 on the shoulder circumferential groove 5 side in parallel to the tire axial direction does not overlap the end portion of the crown lateral groove 14 on the shoulder circumferential groove 5 side. Thus, uneven wear is reduced near the shoulder circumferential groove 5.

Crown Sipe

As shown in FIG. 4, in the present embodiment, the crown block 15 includes, in the tire circumferential direction, a plurality of the crown sipe groups 16 each having the plurality of crown sipes 17 aligned in the tire axial direction.

One crown sipe group 16 includes, for example, 3 to 6 crown sipes 17. In the present embodiment, the crown sipe group 16 is composed of one first crown sipe 18, one second crown sipe 19, and two third crown sipes 20. The first crown sipe 18 is connected to the shoulder circumferential groove 5 (shown in FIG. 2, the same applies to the following description). The second crown sipe 19 is connected to the crown circumferential groove 6 (shown in FIG. 2, the same applies to the following description). The third crown sipes 20 each have both ends terminating at the ground contact surface of the crown block 15.

In each of the plurality of crown blocks 15, two to four crown sipe groups 16 are preferably aligned in the tire circumferential direction. In the present embodiment, three crown sipe groups 16 are aligned in the tire circumferential direction. In a case where the number of the crown sipe groups 16 aligned in the tire circumferential direction is two or more, on-ice performance is enhanced. In a case where the number of the crown sipe groups 16 aligned in the tire circumferential direction is four or less, since shear deformation of the crown land portion 10 (shown in FIG. 2, the same applies to the following description) in the tire circumferential direction is small, uneven wear can be reduced.

In each of the crown sipe groups 16, the plurality of crown sipes 17 adjacent to each other are preferably disposed so as to overlap each other in the tire axial direction. In other words, an imaginary region obtained by extending one of the crown sipes 17 in parallel to the tire circumferential direction overlaps the crown sipe 17 adjacent to the one of the crown sipes 17 in the tire axial direction. In the present embodiment, the first crown sipe 18 and the third crown sipe 20 adjacent to each other are disposed so as to overlap each other in the tire axial direction. Furthermore, the second crown sipe 19 and the third crown sipe 20 adjacent to each other are disposed so as to overlap each other in the tire axial direction. The third crown sipes 20 adjacent to each other are disposed so as to overlap each other in the tire axial direction. The crown sipes 17 thus disposed contribute to enhancement of on-ice performance.

In each of the crown sipe groups 16, the plurality of crown sipes 17 adjacent to each other are more preferably disposed so as to overlap each other in the tire circumferential direction. In other words, an imaginary region obtained by extending one of the crown sipes 17 in parallel to the tire axial direction overlaps the crown sipe 17 adjacent to the one of the crown sipes 17 in the tire axial direction. In the present embodiment, the first crown sipe 18 and the third crown sipe 20 adjacent to each other are disposed so as to overlap each other in the tire circumferential direction. Furthermore, the second crown sipe 19 and the third crown sipe 20 adjacent to each other are disposed so as to overlap each other in the tire circumferential direction. The third crown sipes 20 adjacent to each other are disposed so as to overlap each other in the tire circumferential direction. The crown sipes 17 thus disposed contribute to enhancement of on-ice performance.

Figure 5:
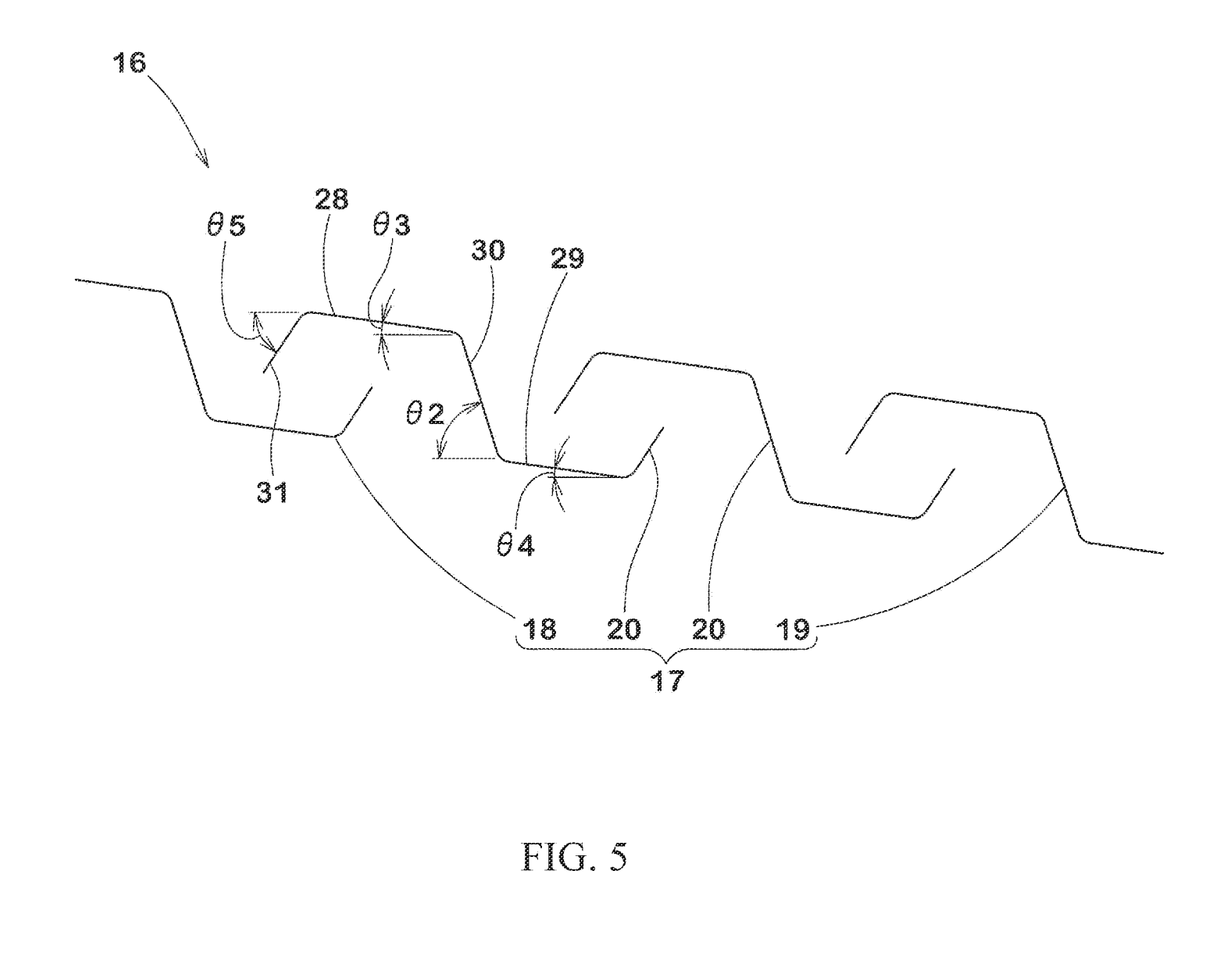
FIG. 5 is a schematic diagram illustrating a crown sipe group in FIG. 4 in an enlarged manner.

FIG. 5 is a schematic diagram illustrating an example of the crown sipe group 16 in an enlarged manner. In FIG. 5, each crown sipe 17 is indicated by a solid line. As shown in FIG. 5, the first crown sipe 18, the second crown sipe 19, and the third crown sipe 20 each include a first sipe piece 28, a second sipe piece 29, and a third sipe piece 30. The first sipe piece 28 extends in the tire axial direction. The second sipe piece 29 extends in the tire axial direction between the tire equator C and the first sipe piece 28. The third sipe piece 30 extends so as to connect between the first sipe piece 28 and the second sipe piece 29. An angle $\theta 2$ of the third sipe piece 30 relative to the tire axial direction is greater than each of an angle $\theta 3$ of the first sipe piece 28 relative to the tire axial direction and an angle $\theta 4$ of the second sipe piece 29 relative to the tire axial direction. The angle $\theta 2$ of the third sipe piece 30 relative to the tire axial direction is, for example, 60 to 80°. Each crown sipe group 16 having such a structure allows a frictional force to be exerted in multiple directions and allows traction performance and cornering performance to be enhanced by an edge effect and the like during running on ice.

The crown sipe 17 included in the crown sipe group 16 is not limited to the above-described structure. For example, the crown sipe 17 may linearly extend without having the above-described sipe pieces, like the first crown sipe 18 of the crown sipe group 16, which is disposed at the center portion of the crown block 15 in the tire circumferential direction as shown in FIG. 4.

An inclined piece 31 extends at the end portion of the crown sipe 17 such that an angle of the inclined piece 31 relative to the tire axial direction is greater than that of the first sipe piece 28 or the second sipe piece 29. An angle $\theta 5$ of the inclined piece 31 relative to the tire axial direction is, for example, 60 to 80°, and is substantially equal to the angle $\theta 2$ of the third sipe piece 30 in the present embodiment. The inclined piece 31 having such a structure can inhibit the crown sipe 17 from being excessively opened and can reduce uneven wear near the crown sipe 17.

As shown in FIG. 4, in the present embodiment, in the first crown sipe 18, the inclined piece 31 is formed at the end portion on the tire equator C side, and the inclined piece 31 is not formed at the end portion on the opposite side. In the second crown sipe 19, the inclined piece 31 is formed at the end portion on the tread end Te side, and the inclined piece 31 is not formed at the end portion on the opposite side. In the third crown sipe 20, the inclined pieces 31 are formed at the end portions, respectively, on both sides in the tire axial direction. The inclined pieces 31 thus disposed contribute to well-balanced enhancement of uneven wear resistance and on-ice performance.

A length, in the tire axial direction, of each of the plurality of the crown sipes 17 included in one crown sipe group 16 is preferably less than 60% of the maximum width W8 (shown in FIG. 2, the same applies to the following description), in the tire axial direction, of the ground contact surface of the crown land portion 10 (shown in FIG. 2, the same applies to the following description). In the present embodiment, preferably, a length L9 of the first crown sipe 18 in the tire axial direction, a length L10 of the second crown sipe 19 in the tire axial direction, and a length L11 of the third crown sipe 20 in the tire axial direction are each less than 60% of the maximum width W8, in the tire axial direction, of the ground contact surface of the crown land portion 10. Thus, shear deformation of the crown land portion 10 in the tire circumferential direction is reduced, whereby uneven wear can be reduced. The length of each of the plurality of the crown sipes 17 in the tire axial direction is more preferably 20% to 50% of the maximum width W8, in the tire axial direction, of the ground contact surface of the crown land portion 10. Thus, shear deformation of the crown land portion 10 in the tire circumferential direction is further reduced, whereby uneven wear can be further reduced.

As shown in FIG. 2, in the present embodiment, the maximum width W7, in the tire axial direction, of the ground contact surface of the shoulder land portion 9 is greater than the maximum width W8, in the tire axial direction, of the ground contact surface of the crown land portion 10. Specifically, the maximum width W7 is preferably 105% of the maximum width W8 or more. The maximum width W7 is more preferably 105% to 120% of the maximum width W8. Thus, stiffness of the shoulder land portion 9 becomes high, and shear deformation in the tire circumferential direction is reduced, whereby uneven wear can be reduced.

As shown in FIG. 1, tread rubber of the tread portion 2 has a complex elastic modulus $E^*$ of 5.0 to 9.0 MPa at 0° C. Thus, cornering performance and uneven wear resistance on ice are enhanced in a well-balanced manner. The complex elastic modulus $E^*$ is a value measured by using a viscoelasticity spectrometer under the following conditions in accordance with the standard of JIS-K6394.

Initial strain: 10%
Amplitude: ±2%
Frequency: 10 Hz
Deformation mode: tensile
Measurement temperature: 0° C.

Although the tire according to one embodiment of the present invention has been described above in detail, the present invention is not limited to the above-described specific embodiment, and various modifications can be made to implement the present invention.

Appendixes

The present invention includes the following aspects.

Invention 1

A tire including
a tread portion, in which
the tread portion includes a pair of tread ends, three circumferential grooves continuously extending in a tire circumferential direction between the pair of tread ends, and four land portions demarcated by the three circumferential grooves,
the three circumferential grooves include one shoulder circumferential groove, and one crown circumferential groove adjacent to an inner side of the shoulder circumferential groove in a tire axial direction,
the four land portions include one shoulder land portion demarcated outward of the shoulder circumferential groove in the tire axial direction, and one crown land portion demarcated between the shoulder circumferential groove and the crown circumferential groove,
the shoulder land portion includes a plurality of shoulder blocks demarcated by a plurality of shoulder lateral grooves that extend fully across the shoulder land portion in the tire axial direction,
each of the plurality of shoulder blocks has a plurality of shoulder sipes extending in the tire axial direction,
an inner end of each of the plurality of shoulder sipes in the tire axial direction terminates at a ground contact surface of the shoulder block without connecting to the shoulder circumferential groove,
the crown land portion includes a plurality of crown blocks demarcated by a plurality of crown lateral grooves that extend fully across the crown land portion in the tire axial direction,
each of the plurality of crown blocks includes, in a tire circumferential direction, a plurality of crown sipe groups each having a plurality of crown sipes aligned in the tire axial direction, and
each of the crown sipe groups includes one first crown sipe having one end connected to the shoulder circumferential groove and another end terminating at a ground contact surface of the crown block, one second crown sipe having one end connected to the crown circumferential groove and another end terminating at the ground contact surface of the crown block, and at least one third crown sipe having both ends terminating at the ground contact surface of the crown block.

Invention 2

The tire according to Invention 1, in which a length of each of the plurality of shoulder sipes in the tire axial direction is less than 60% of a maximum width, in the tire axial direction, of a ground contact surface of the shoulder land portion.

Invention 3

The tire according to Invention 1 or 2, in which each of the plurality of shoulder blocks has the four to six shoulder sipes aligned in the tire circumferential direction.

Invention 4

The tire according to any one of Inventions 1 to 3, in which each of the plurality of shoulder blocks has a first sipe group in which a plurality of the shoulder sipes are aligned on the shoulder circumferential groove side in the tire circumferential direction, and a second sipe group in which a plurality of the shoulder sipes are aligned on the tread end side in the tire circumferential direction.

Invention 5

The tire according to any one of Inventions 1 to 4, in which the plurality of shoulder sipes include a shoulder sipe in which a distance in the tire axial direction from the inner end to the shoulder circumferential groove is 1 to 5 mm.

Invention 6

The tire according to any one of Inventions 1 to 5, in which a length, in the tire axial direction, of each of the plurality of crown sipes included in the one crown sipe group is less than 60% of a maximum width, in the tire axial direction, of a ground contact surface of the crown land portion.

Invention 7

The tire according to any one of Inventions 1 or 6, in which each of the first crown sipe, the second crown sipe, and the third crown sipe includes a first sipe piece extending in the tire axial direction, a second sipe piece extending in the tire axial direction between a tire equator and the first sipe piece, and a third sipe piece extending so as to connect between the first sipe piece and the second sipe piece such that an angle of the third sipe piece relative to the tire axial direction is greater than each of an angle of the first sipe piece relative thereto and an angle of the second sipe piece relative thereto.

Invention 8

The tire according to any one of Inventions 1 to 7, in which each of the plurality of crown blocks has the two to four crown sipe groups aligned in the tire circumferential direction.

Invention 9

The tire according to any one of Inventions 1 to 8, in which, in each of the crown sipe groups, the plurality of crown sipes adjacent to each other are disposed so as to overlap each other in the tire axial direction.

Invention 10

The tire according to Invention 9, in which, in each of the crown sipe groups, the plurality of crown sipes adjacent to each other are disposed so as to overlap each other in the tire circumferential direction.

Invention 11

The tire according to any one of Inventions 1 to 10, in which the maximum width, in the tire axial direction, of the ground contact surface of the shoulder land portion is greater than the maximum width, in the tire axial direction, of the ground contact surface of the crown land portion.

What is claimed is:

1. A tire comprising a tread portion, wherein
the tread portion includes a pair of tread ends, three circumferential grooves continuously extending in a tire circumferential direction between the pair of tread ends, and four land portions demarcated by the three circumferential grooves,
the three circumferential grooves include one shoulder circumferential groove, and one crown circumferential groove adjacent to an inner side of the shoulder circumferential groove in a tire axial direction,
the four land portions include one shoulder land portion demarcated outward of the shoulder circumferential groove in the tire axial direction, and one crown land portion demarcated between the shoulder circumferential groove and the crown circumferential groove,
the shoulder land portion includes a plurality of shoulder blocks demarcated by a plurality of shoulder lateral grooves that extend fully across the shoulder land portion in the tire axial direction,
each of the plurality of shoulder blocks has a plurality of shoulder sipes extending in the tire axial direction,
an inner end of each of the plurality of shoulder sipes in the tire axial direction terminates at a ground contact surface of the shoulder block without connecting to the shoulder circumferential groove,
the crown land portion includes a plurality of crown blocks demarcated by a plurality of crown lateral grooves that extend fully across the crown land portion in the tire axial direction,
each of the plurality of crown blocks includes, in a tire circumferential direction, a plurality of crown sipe groups each having a plurality of crown sipes aligned in the tire axial direction,
each of the crown sipe groups includes one first crown sipe having one end connected to the shoulder circumferential groove and another end terminating at a ground contact surface of the crown block, one second crown sipe having one end connected to the crown circumferential groove and another end terminating at the ground contact surface of the crown block, and at least one third crown sipe having both ends terminating at the ground contact surface of the crown block,
each of the first crown sipe, the second crown sipe, and the third crown sipe includes a first sipe piece extending in the tire axial direction, a second sipe piece extending in the tire axial direction between a tire equator and the first sipe piece, and a third sipe piece extending so as to connect between the first sipe piece and the second sipe piece such that an angle of the third sipe piece relative to the tire axial direction is greater than each of an angle of the first sipe piece relative thereto and an angle of the second sipe piece relative thereto,
one end of the second sipe piece of the second crown sipe is connected to the crown circumferential groove,
each of the plurality of shoulder blocks has a first sipe group in which a plurality of the shoulder sipes are aligned on the shoulder circumferential groove side in the tire circumferential direction, and a second sipe group in which a plurality of the shoulder sipes are aligned on the tread end side in the tire circumferential direction,
a length of each of the plurality of shoulder sipes of the first sipe group in the in the tire axial direction is greater than a length of the at least one third crown sipe,
in each of the crown sipe groups, the plurality of crown sipes adjacent to each other are disposed so as to overlap each other in the tire axial direction,
in each of the crown sipe groups, the plurality of crown sipes adjacent to each other are disposed so as to overlap each other in the tire circumferential direction, and
each of the plurality of shoulder sipes has a zigzag shape.

2. The tire according to claim 1, wherein a length of each of the plurality of shoulder sipes in the tire axial direction is less than 60% of a maximum width, in the tire axial direction, of a ground contact surface of the shoulder land portion.

3. The tire according to claim 1, wherein each of the plurality of shoulder blocks has four to six of the shoulder sipes aligned in the tire circumferential direction.

4. The tire according to claim 1, wherein the plurality of shoulder sipes include a shoulder sipe in which a distance in the tire axial direction from the inner end to the shoulder circumferential groove is 1 to 5 mm.

5. The tire according to claim 1, wherein a length, in the tire axial direction, of each of the plurality of crown sipes included in the one crown sipe group is less than 60% of a maximum width, in the tire axial direction, of a ground contact surface of the crown land portion.

6. The tire according to claim 1, wherein each of the plurality of crown blocks has two to four of the crown sipe groups aligned in the tire circumferential direction.

7. The tire according to claim 1, wherein a maximum width, in the tire axial direction, of a ground contact surface of the shoulder land portion is greater than a maximum width, in the tire axial direction, of a ground contact surface of the crown land portion.

8. The tire according to claim 1, wherein the tread portion extends a distance in the tire axial direction from a groove center line of the shoulder circumferential groove to a tire equator that is 20% to 30% of a tread width.

9. The tire according to claim 1, wherein a groove width of at least one of the circumferential grooves is at least 3.0 mm.

10. The tire according to claim 1, wherein a groove width of at least one of the circumferential grooves is 3.0% to 6.0% of a tread width.

11. The tire according to claim 1, wherein a depth of at least one of the circumferential grooves is 5.0 to 15.0 mm.

12. The tire according to claim 1, wherein a groove width of the crown circumferential groove is 3.0% to 4.0% of a tread width, and a groove width of a circumferential groove portion of the shoulder circumferential groove is 4.0% to 5.0% of a tread width.

13. The tire according to claim 1, wherein a maximum angle of each of the crown lateral grooves relative to the tire axial direction is 30°.

14. The tire according to claim 1, wherein the angle of the third sipe piece relative to the tire axial direction is 60 to 80°.

15. The tire according to claim 1, wherein each of the crown sipes includes a first sipe piece, a second sipe piece and an inclined piece, and the inclined piece extends at an end portion of the crown sipe such that an angle of the inclined piece relative to the tire axial direction is greater than that of the first sipe piece or the second sipe piece.

16. The tire according to claim 1, wherein in the plurality of shoulder sipes and the plurality of crown sipes, a width between two opposing inner walls is from 0.3 mm to 1.5 mm.

17. The tire according to claim 1, wherein a distance in the tire axial direction between ends of adjacent shoulder sipes among the plurality of shoulder sipes is 2.0 to 5.0 mm.

18. The tire according to claim 1, wherein, in the zigzag shape of the plurality of shoulder sipes, an angle of a straight line between both ends of each of the plurality of shoulder sipes, relative to the tire axial direction, is preferably 0° to 5°.

19. The tire according to claim 1, wherein a length of each of the plurality of shoulder sipes of the first sipe group in the in the tire axial direction is greater than a length of each of the plurality of shoulder sipes of the second sipe group.

20. The tire according to claim 1, wherein the shoulder circumferential groove has a zigzag shape including a plurality of circumferential groove portions and a plurality of lateral groove portions that alternate in the tire circumferential direction, the plurality of circumferential groove portions being formed by two edges that are inclined at an angle of 5° to 15° relative to the tire circumferential direction and the plurality of lateral groove portions being formed by two edges disposed at an angle of 10° or less relative to the tire axial direction, and     each shoulder lateral groove of the plurality of shoulder lateral grooves includes an inner groove portion and an outer groove portion, the inner groove portion being connected to the shoulder circumferential groove and extending with a first groove width, the outer groove portion being connected to an outer side of the inner groove portion in the tire axial direction and extending with a second groove width, the second groove width being 130% to 150% of the first groove width.

\* \* \* \* \*